United States Patent
Greene

(10) Patent No.: US 6,698,048 B1
(45) Date of Patent: Mar. 2, 2004

(54) MOTORIZED DEVICE FOR CUTTING AND CLEANING A PIECE OF PIPE

(76) Inventor: R. T. Greene, 1453 Pepper Dr., El Cajon, CA (US) 92021

( * ) Notice: Subject to any disclaimer, the term of this patent is extended or adjusted under 35 U.S.C. 154(b) by 16 days.

(21) Appl. No.: 10/056,458

(22) Filed: Jan. 25, 2002

(51) Int. Cl.$^7$ ............................................... B26B 11/00
(52) U.S. Cl. ..................... 7/158; 7/157; 7/159; 30/101; 29/90.01
(58) Field of Search ............................. 7/157, 158, 159; 30/101, 102; 29/90.01, 81.021, 81.12

(56) References Cited

U.S. PATENT DOCUMENTS

| 3,355,749 | A | | 12/1967 | Steffen | |
|---|---|---|---|---|---|
| 3,774,255 | A | | 11/1973 | Pao | |
| 4,238,867 | A | | 12/1980 | Ruggero et al. | |
| 4,349,928 | A | * | 9/1982 | Mlikotin | 7/157 |
| D310,470 | S | | 9/1990 | Tohdoh | |
| 4,953,292 | A | * | 9/1990 | Tobey | 30/97 |
| 5,829,142 | A | * | 11/1998 | Rieser | 30/93 |
| 6,106,370 | A | * | 8/2000 | Carter | 451/51 |
| 6,202,307 | B1 | * | 3/2001 | Wrate | 30/101 |

* cited by examiner

*Primary Examiner*—Joseph J. Hail, III
*Assistant Examiner*—Alvin J Grant

(57) ABSTRACT

A motorized device for cutting and cleaning a piece of pipe for more quickly and efficiently working with piping. The motorized device for cutting and cleaning a piece of pipe includes a housing that has a pair of opposite ends and at least one pair of protruding portions being formed on one of the ends. At least one motor that has a motor shaft is mounted in the housing. A power supply is mounted in the housing for selectively providing power to the motor and at least one switch is mounted on the housing for selectively providing power to the motor. At least one attachment is removably mounted on the motor shaft for engaging a pipe.

15 Claims, 10 Drawing Sheets

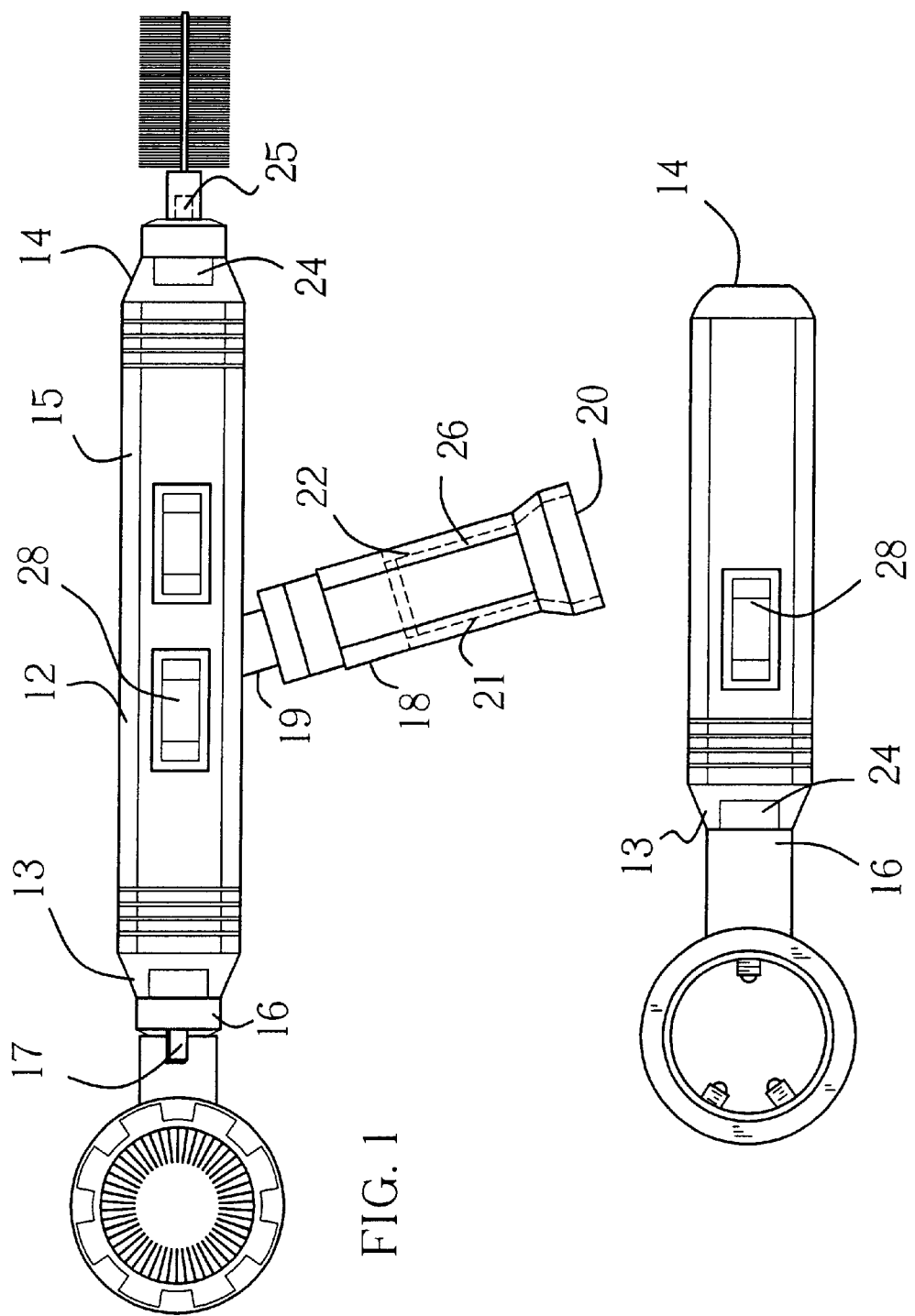

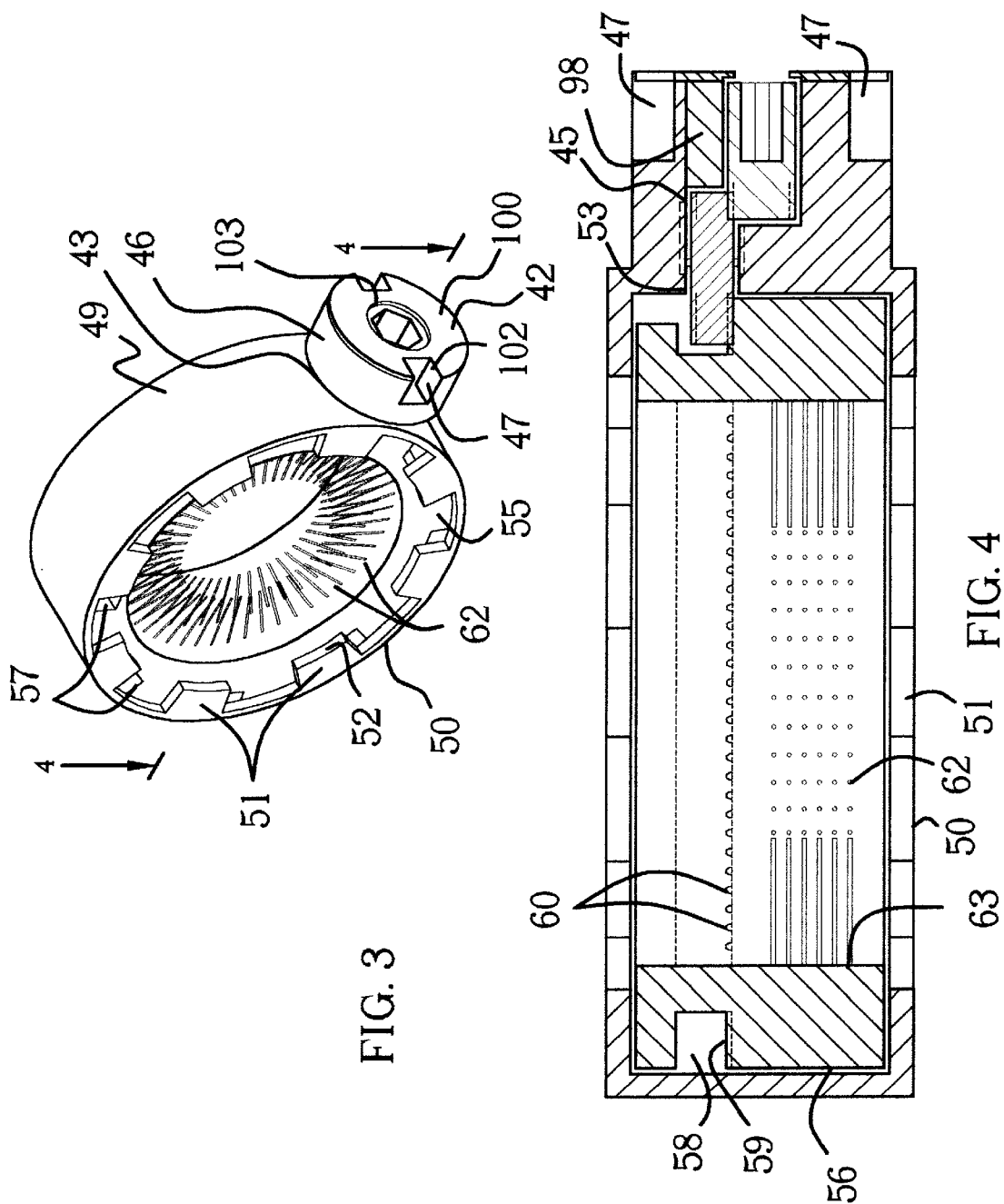

MOTORIZED DEVICE FOR CUTTING AND CLEANING A PIECE OF PIPE

BACKGROUND OF THE INVENTION

1. Field of the Invention

The present invention relates to plumbing tools and more particularly pertains to a new motorized device for cutting and cleaning a piece of pipe for more quickly and efficiently working with piping.

2. Description of the Prior Art

The use of plumbing tools is known in the prior art. More specifically, plumbing tools heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,238,867; 4,349,928; 5,829,142; 3,355,749; 3,774,255; and U.S. Pat. No. Des. 310,470.

While these devices fulfill their respective, particular objectives and requirements, the aforementioned patents do not disclose a new motorized device for cutting and cleaning a piece of pipe. The inventive device includes a housing that has a pair of opposite ends and at least one pair of protruding portions being formed on one of the ends. At least one motor that has a motor shaft is mounted in the housing. A power supply is mounted in the housing for selectively providing power to the motor and at least one switch is mounted on the housing for selectively providing power to the motor. At least one attachment is removably mounted on the motor shaft for engaging a pipe.

In these respects, the motorized device for cutting and cleaning a piece of pipe according to the present invention substantially departs from the conventional concepts and designs of the prior art, and in so doing provides an apparatus primarily developed for the purpose of more quickly and efficiently working with piping.

SUMMARY OF THE INVENTION

In view of the foregoing disadvantages inherent in the known types of plumbing tools now present in the prior art, the present invention provides a new motorized device for cutting and cleaning a piece of pipe construction wherein the same can be utilized for more quickly and efficiently working with piping.

The general purpose of the present invention, which will be described subsequently in greater detail, is to provide a new motorized device for cutting and cleaning a piece of pipe apparatus and method which has many of the advantages of the plumbing tools mentioned heretofore and many novel features that result in a new motorized device for cutting and cleaning a piece of pipe which is not anticipated, rendered obvious, suggested, or even implied by any of the prior art plumbing tools, either alone or in any combination thereof.

To attain this, the present invention generally comprises a housing that has a pair of opposite ends and at least one, pair of protruding portions being formed on one of the ends. At least one motor that has a motor shaft is mounted in the housing. A power supply is mounted in the housing for selectively providing power to the motor and at least one switch is mounted on the housing for selectively providing power to the motor. At least one attachment is removably mounted on the motor shaft for engaging a pipe.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new motorized device for cutting and cleaning a piece of pipe apparatus and method which has many of the advantages of the plumbing tools mentioned heretofore and many novel features that result in a new motorized device for cutting and cleaning a piece of pipe which is not anticipated, rendered obvious, suggested, or even implied by any of the prior art plumbing tools, either alone or in any combination thereof.

It is another object of the present invention to provide a new motorized device for cutting and cleaning a piece of pipe which may be easily and efficiently manufactured and marketed.

It is a further object of the present invention to provide a new motorized device for cutting and cleaning a piece of pipe which is of a durable and reliable construction.

An even further object of the present invention is to provide a new motorized device which is susceptible of a low cost of manufacture with regard to both materials and labor, and which accordingly is then susceptible of low prices of sale to the consuming public, thereby making such motorized device for cutting and cleaning a piece of pipe economically available to the buying public.

Still yet another object of the present invention is to provide a new motorized device which provides in the apparatuses and methods of the prior art some of the advantages thereof, while simultaneously overcoming some of the disadvantages normally associated therewith.

Still another object of the present invention is to provide a new motorized device for more quickly and efficiently working with piping.

Yet another object of the present invention is to provide a new motorized device for cutting and cleaning a piece of pipe which includes a housing that has a pair of opposite ends and at least one pair of protruding portions being formed on one of the ends. At least one motor that has a motor shaft is mounted in the housing. A power supply is mounted in the housing for selectively providing power to the motor and at least one switch is mounted on the housing for selectively providing power to the motor. At least one attachment is removably mounted on the motor shaft for engaging a pipe.

Still yet another object of the present invention is to provide a new motorized device for cutting and cleaning a piece of pipe that reduces the likelihood of repetitive motion injuries caused from manually turning, cleaning and cutting devices in the prior art.

Even still another object of the present invention is to provide a new motorized device for cutting and cleaning a piece of pipe that can clean and cut all types and sizes of tubing and piping, such as, for example, one-quarter inch, three-eighths inch, one-half inch, five-eighths inch, three-quarters inch and one inch. The present invention is capable of cutting and cleaning, copper, aluminum, or plastic tubing.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic frontal view of a new motorized device for cutting and cleaning a piece of pipe according to the present invention.

FIG. 2 is a schematic frontal view of an optional embodiment of the present invention.

FIG. 3 is a schematic perspective view of an exterior brushing attachment of the present invention.

FIG. 4 is a schematic cross-sectional view of the present invention taken along line 4—4 of FIG. 3.

DESCRIPTION OF THE PREFERRED EMBODIMENT

Figure 5:
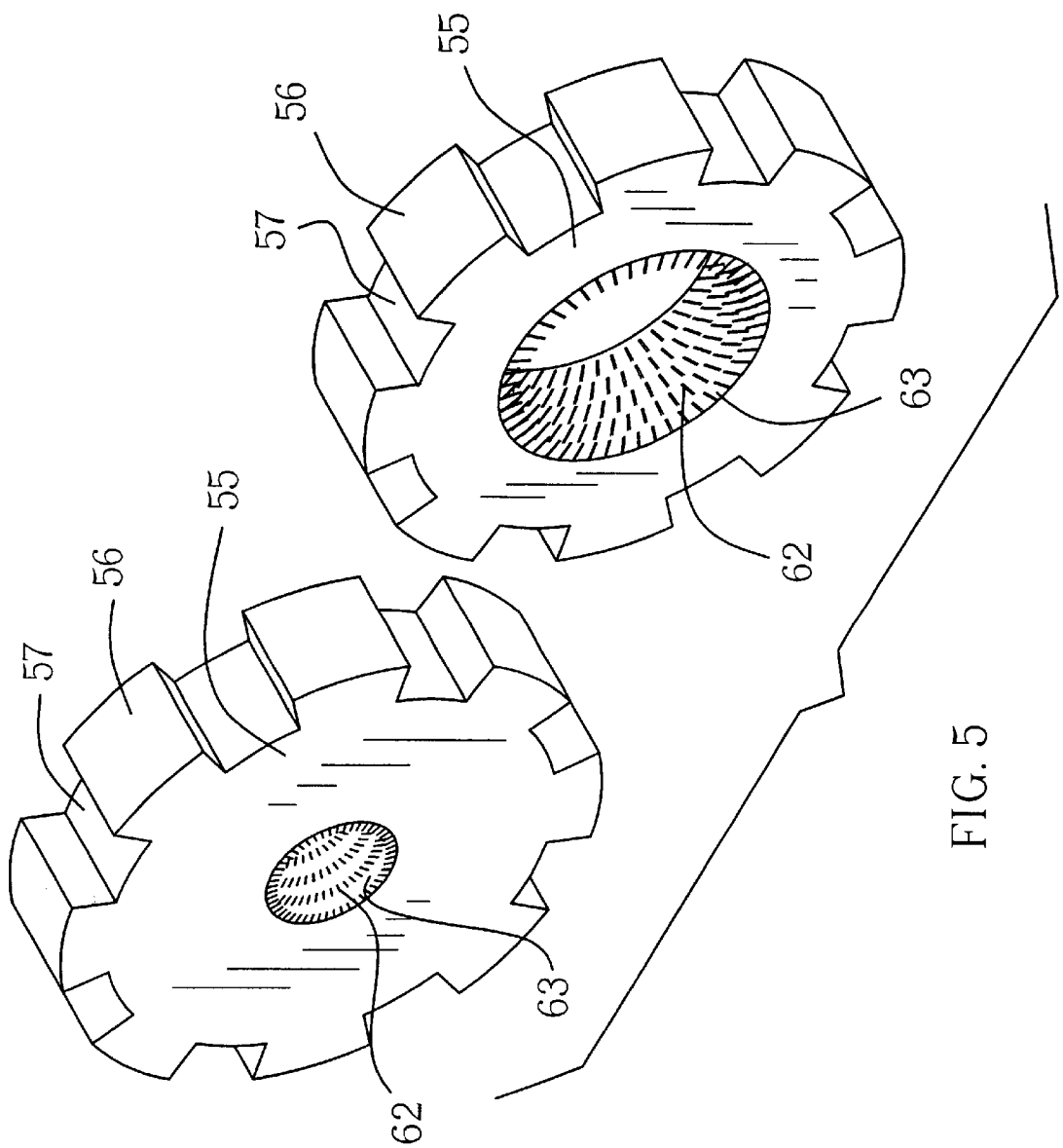
FIG. 5 is a schematic perspective view a pair of inserts for interchangeable, removable insertion into the exterior brushing attachment shown in FIG. 3.
Figure 6:
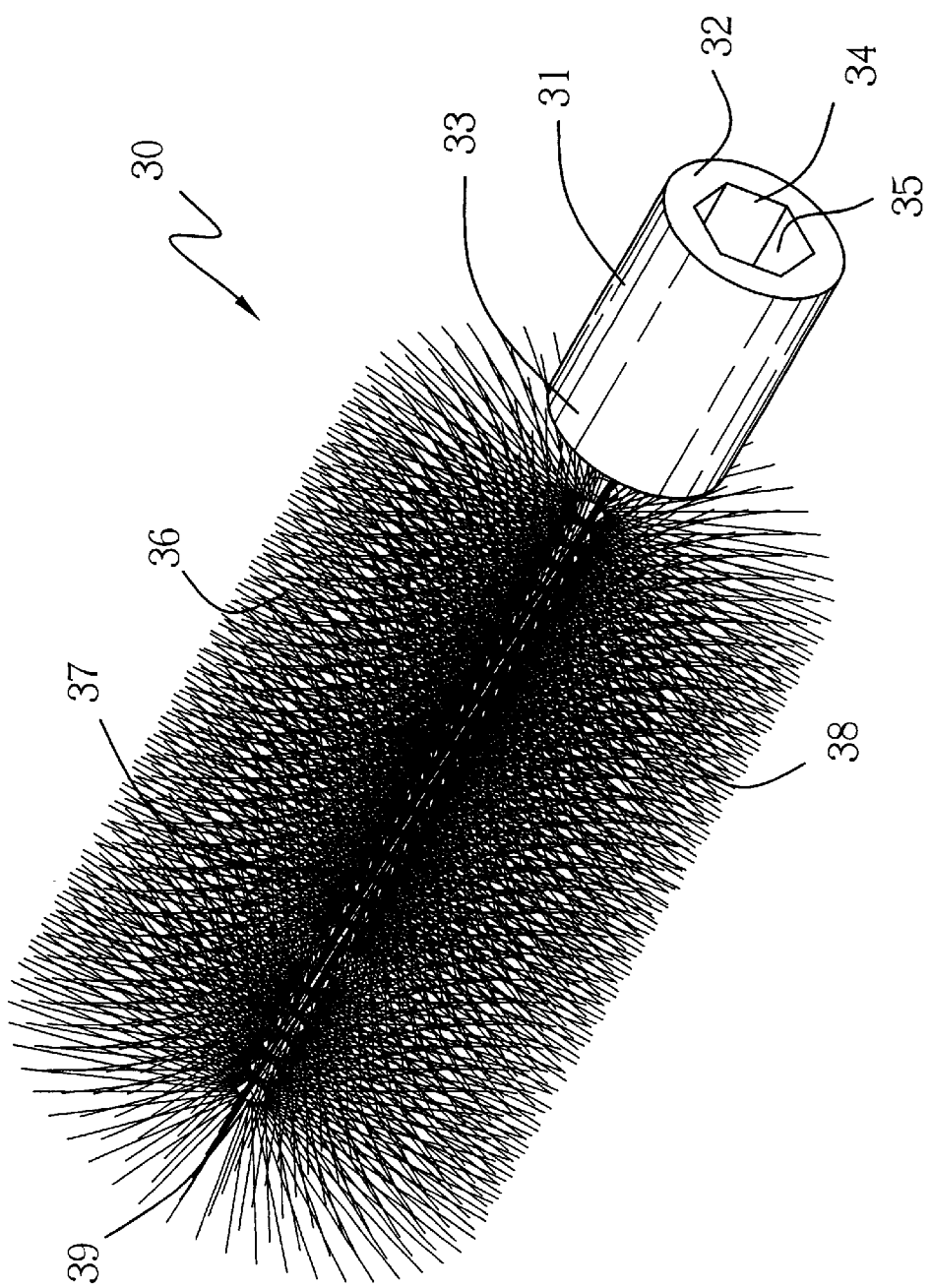
FIG. 6 is a schematic perspective view of an interior brushing attachment of the present invention.

With reference now to the drawings, and in particular to FIGS. 1 through 12 thereof, a new motorized device for cutting and cleaning a piece of pipe embodying the principles and concepts of the present invention and generally designated by the reference numeral 10 will be described.

As best illustrated in FIGS. 1 through 12, the motorized device 10 for cutting and cleaning a piece of pipe generally comprises a housing 12 that includes a first end 13, a second end 14 and a peripheral wall 15 extending between the first 13 and second 14 ends. Each of the ends 13 and 14 may include a perimeter shoulder 16 formed thereon. Additionally, at least one end 13 or 14 of the housing 12 may include a pair of protruding portions 17 formed thereon. The housing 12 may comprise a substantially rigid material such as, for example, a plastic or metal material.

As illustrated in FIG. 1, a member 18 may be provided for holding the housing 12. The handle member 18 may include a first end 19, a second end 20 and a peripheral wall 21 extending therebetween. The first end 19 of the handle member 18 may be pivotally coupled to a bottom portion of the housing 12. The second end 20 of the handle member 18 may include a cavity 22 extending therein. The first end 19 of the handle member 18 is preferably positioned generally at an equal distance between the first 13 and second 14 ends of the housing 12.

As illustrated in FIG. 2, at least one motor 24 is mounted in the housing 12, however, as illustrated in FIG. 1, a pair of motors 24 may be provided. The motor 24 includes a motor shaft 25 extending away therefrom. The motor 24 is positioned generally adjacent to one of the ends 13 or 14 of the housing 12 such that the motor shaft 25 extends axially through one of the ends 13 or 14 of the housing 12. An outer surface of the motor shaft 25 may have a generally hexagonal shape for securing attachments to the housing 12, however, other shapes may be employed. The motor 24 may comprise a reversible motor.

A power supply 26 may be provided for selectively providing power to the motor 24. The power supply 26 may be removably positioned in the cavity 22 in the second end 20 of the handle member 18. The power supply 26 may comprise a rechargeable battery.

As illustrated in FIGS. 1 and 2, at least one switch 28 may be provided for selectively providing power to the motor 24. The switch 28 is operationally coupled to the motor 24 and is preferably mounted on the peripheral wall 15 of the housing 12. In one embodiment of the present invention, as particularly illustrated in FIG. 1, the switch 28 may be positioned generally adjacent to the first end 13 of the handle member 18. The switch 28 may control a forward and reverse direction of the motor 24.

The motorized device 10 also includes at least one attachment that is removably mounted on the housing 12. A first attachment 30, or pipe interior brushing attachment, may be provided for cleaning an interior of the pipe. As particularly illustrated in FIG. 6, the first attachment 30 may include a socket 31 for connecting the first attachment 30 to the motor shaft 25. The socket 31 includes a first end 32 and a second end 33 with a bore 34 extending into the first end 32 of the socket 31. The bore 34 may extend toward the second end 33 of the socket 31. The motor shaft 25 is removably insertable into the bore 31. An inner surface 35 of the bore 34 may include a generally hexagonal shape for receiving a motor shaft 25 having a hexagonal shape.

In order to clean an interior of the pipe, a brush head 36 may be provided that includes an elongated central portion 37 and a plurality of bristle portions 38 mounted on the second end 33 of the socket 31. A longitudinal axis of the central portion 37 may be axially aligned with a longitudinal axis of the bore 31. The bristle portions 38 may be mounted perpendicularly on the central portion 37 such that each of the bristle portions 38 radiates outwardly from the central portion 37.

The central portion 37 may have a length measuring approximately three-eighths of an inch to one-inch. However, the central portion 37 may be manufactured in a variety of lengths permitting the brush head 36 to clean longer lengths of pipe. Additionally, the brush head 36 may be manufactured with bristle portions 38 of various lengths for pipes having different inner diameters.

The motorized device 10 may also include other attachments. In particular, an additional group of second attachments may be provided that includes an exterior brushing attachment 2 for cleaning a portion of an exterior surface of a pipe (see FIGS. 3 through 5) and a cutting attachment 4 for cutting a pipe (see FIGS. 7 through 10 and 12). This group of attachments may include some common elements, and each of the second attachments preferably includes a base member 41 for connecting each of the second attachments to the motor shaft 25. The base member 41 includes a first end 42 and a second end 43. The first end 42 of the base member 41 includes a bore 44 extending toward the second end 43 of the base member 41. The second end 43 of the base member 41 preferably includes a channel 45 extending through the first 42 and second 43 ends of the base member 41 that is in communication with the bore 44 of the base member 41. An outer surface 46 of the base member 41 may include a pair of channels 47 extending therein for removably receiving each of protruding portions 17 of the housing 12.

An outer annular member 49 is mounted on the second end 43 of the base member 41. The outer annular member 49 preferably includes at least one edge 50 with a plurality of spaced tab portions 51 formed thereon. An end 52 of each of the tab portions 51 extends toward a central axis of the outer annular member 49. The outer annular member 49 includes a hole 53 extending into the channel 45 in the base portion 41.

An inner annular member 55 is removably mounted in the outer annular member 49. An outer surface 56 of the inner annular member 55 includes a plurality of channels 57 extending therein. Each of the channels 57 includes a size and shape designed for selectively receiving one of the tab portions 51 of the outer annular member 49 such that the inner annular member 55 may be moved between the tab portions 51 when the tab portions 51 are aligned with the channels 57. In one embodiment of the present invention, the inner annular member 55 is rotatably mounted in the outer annular member 49. The outer surface 56 of the inner annular member 55 includes an annular groove 58 therein. An inner surface 59 of the annular groove 58 includes a plurality of teeth 60 formed thereon.

As illustrated in FIGS. 3 through 5, the inner annular member 55 of the exterior brushing attachment 2 includes a plurality of spaced cleaning members 62 for cleaning the exterior of the pipe. Each of the cleaning members 62 is mounted on an inner surface 63 of the inner annular member 55.

Each of the cleaning members 62 is preferably orientated generally perpendicular to a central axis of the inner annular member 55. The inner annular members 55 may have cleaning members 62 of various lengths for cleaning the exterior of pipes having different diameters. Also, an inner diameter of the inner annular member insert may be varied to fit different pipe sizes (see FIG. 5). The inner annular member 55 with cleaning members 62 may permit the cleaning of three-eighths inch to one-inch diameter pipes. However, the inner annular member 55 and cleaning members 62 may be manufactured to permit the cleaning of various sized pipes.

As illustrated in FIGS. 7 through 10 and 12, the inner annular member 55 of the cutting attachment 4 includes a cutting assembly 65 for cutting the pipe. The cutting assembly 65 may include a threaded post 66 that is mounted in a bore 67 extending in the inner surface 63 of the inner annular member 55. The outer surface 68 of the threaded post 66 is preferably threaded. The threaded post 66 is preferably positionable between a retracted position and an extended position. In one embodiment of the present invention, the retracted position is characterized by a first end 69 of the threaded post 66 being positioned generally adjacent to the inner surface 63 of the inner annular member 55. The extended position is characterized by the first end 69 of the threaded post 66 being positioned generally nearer a central axis of the inner annular member 55 than the inner surface 63 of the inner annular member 55.

A guide rod 70 may be provided for guiding the threaded post 66 between the retracted position and the extended position. The guide rod 70 is mounted on a bottom wall 71 of the bore 67 of the inner annular member 55. An end 72 of the guide rod 70 is slidably positioned in a hole 73 extending in a second end 74 of the threaded post 66. The guide rod 70 preferably has a generally square shape to prevent rotational movement of the threaded post 66.

A cutting member 76 is provided for cutting the pipe. The cutting member 76 is rotatably mounted on the first end 69 of the threaded post 66. The cutting member 76 may comprise a substantially rigid material such as, for example, a steel material.

Figure 8:
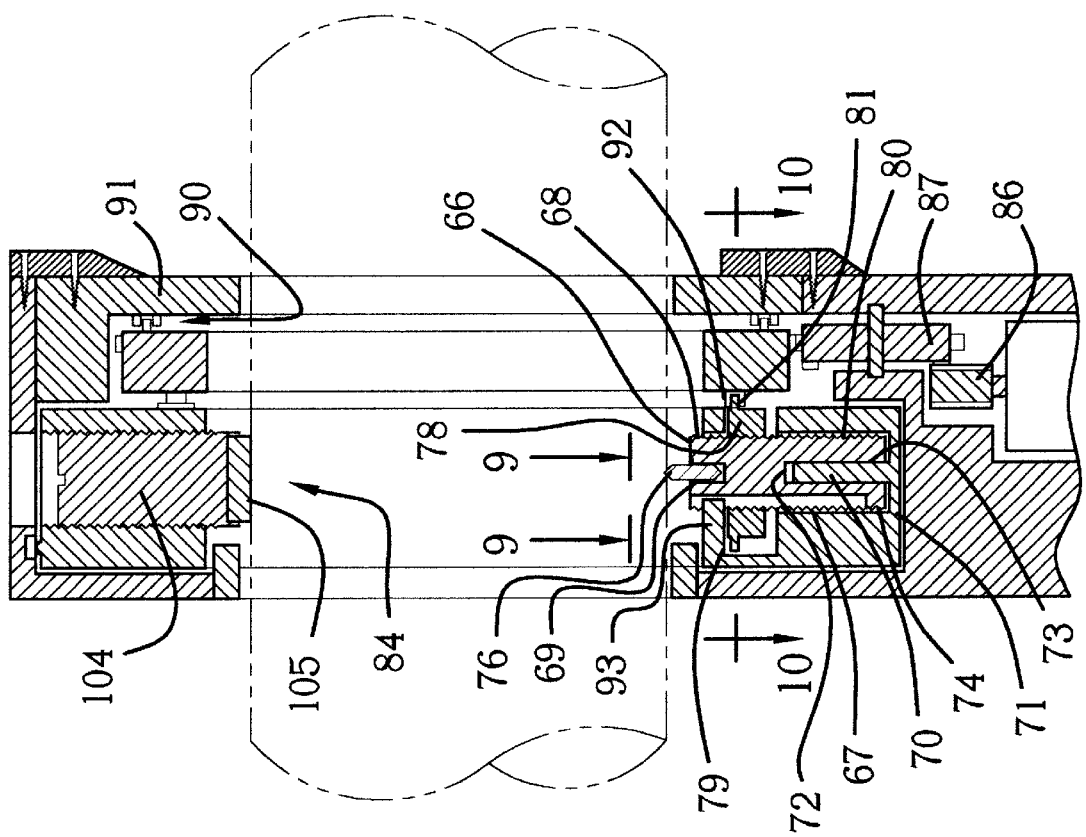
FIG. 8 is a schematic cross-sectional view of the cutting attachment of FIG. 7 taken along the line 8—8 of FIG. 7.
Figure 9:
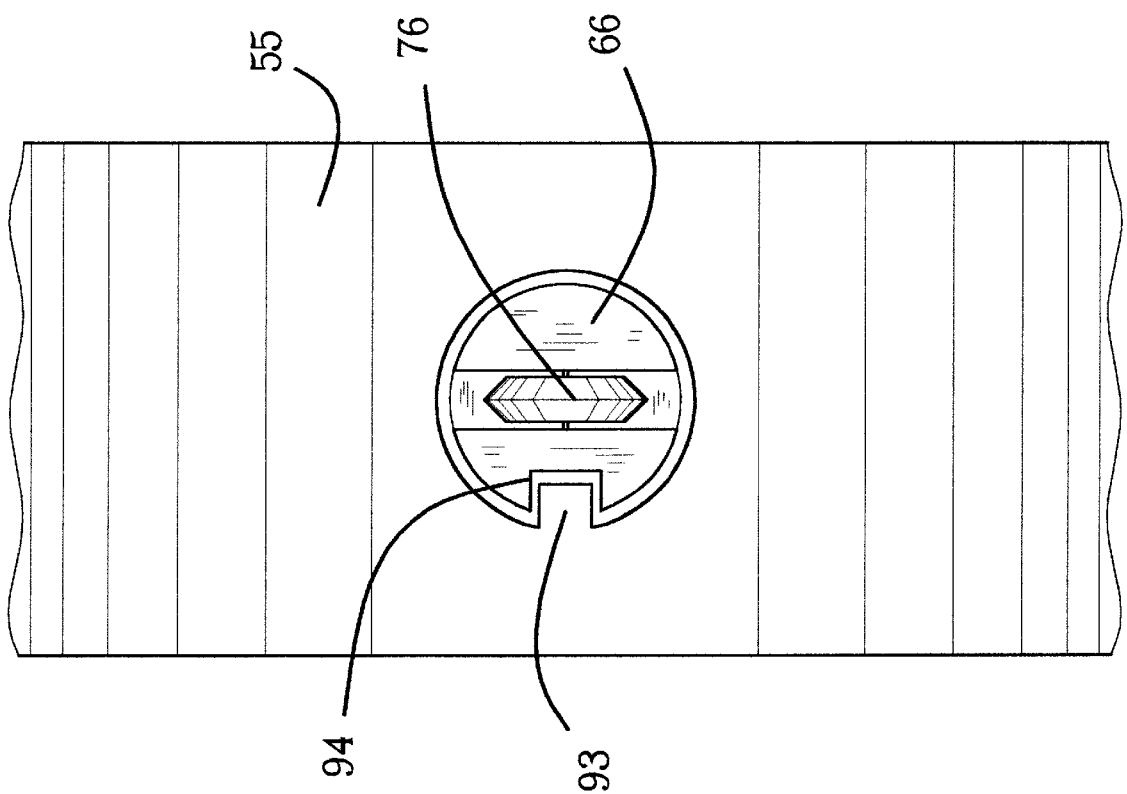
FIG. 9 is a schematic view of a broken away portion of the cutting attachment of FIGS. 7 and 8 taken from the point of view of line 9—9 in FIG. 8.
Figure 10:
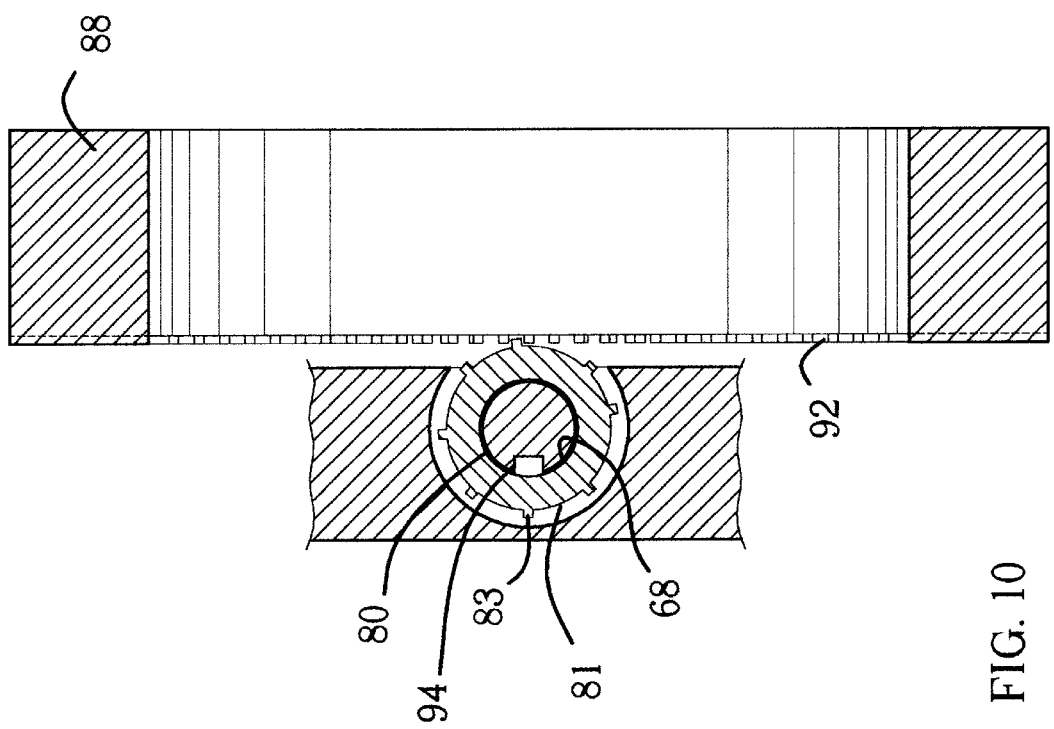
FIG. 10 is a schematic cross sectional view of a portion of the cutting attachment taken along the line 10—10 in FIG. 8.
Figure 11:
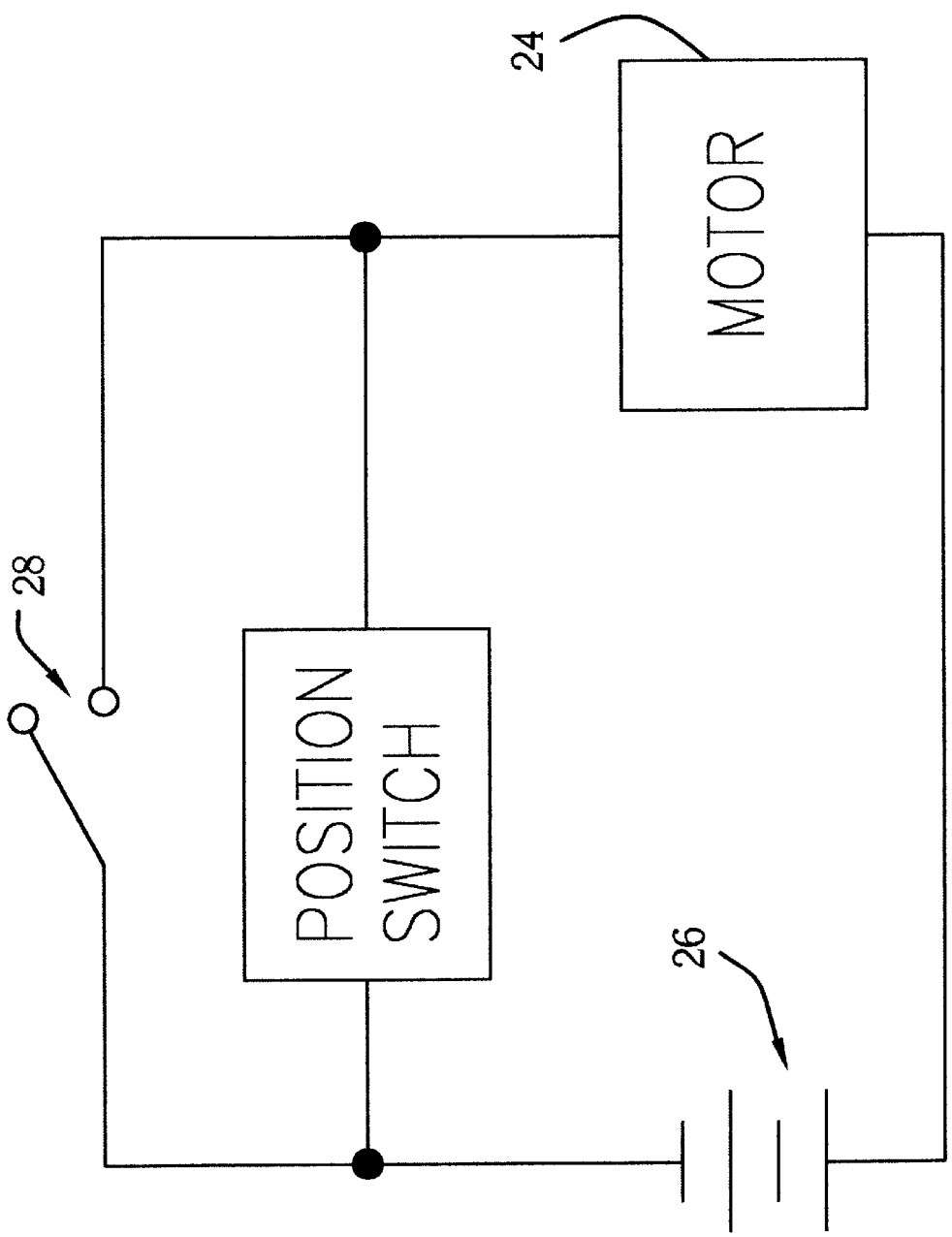
FIG. 11 is a schematic circuit diagram of the present invention.
Figure 12:
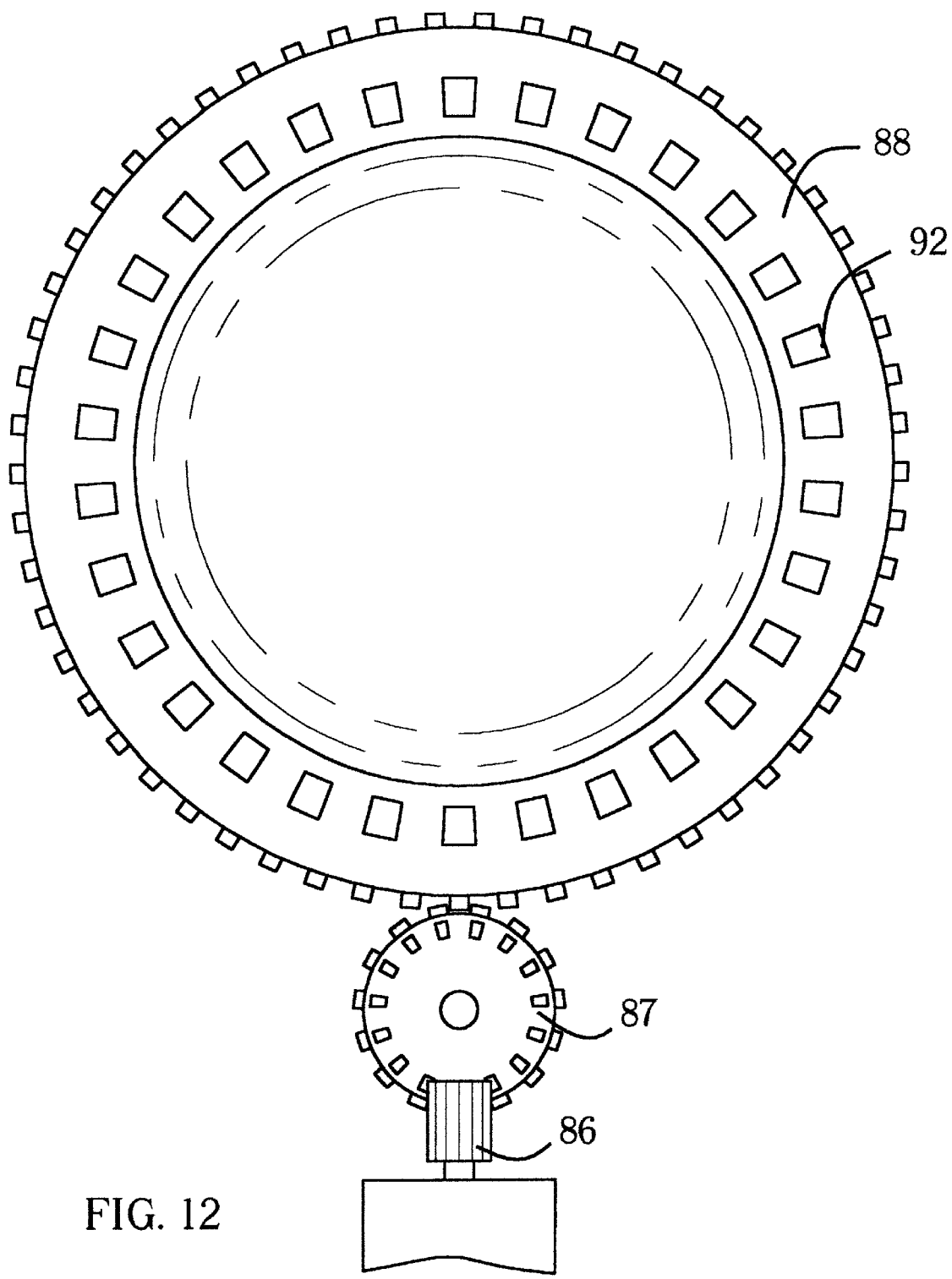
FIG. 12 is a schematic side view of the drive gear, transfer gear, and ring transfer gear of the cutting attachment of the present invention isolated from the other elements of the structure.

A horizontal gear 78 is provided for moving the threaded post 66 between the retracted position and the extended position. The horizontal gear 78 is preferably mounted in an orbicular channel 79 in the bore 67 of the inner annular member 55. The orbicular channel 79 and the annular channel 58 of the inner annular member 55 are in communication. As illustrated in FIG. 8, the threaded post 66 extends through a central portion of the horizontal gear 78. The horizontal gear 78 includes an inner threaded edge 80 and an outer edge 81. The inner threaded edge 80 is selectively engaged with the outer surface 68 of the threaded post 66. The outer edge 81 of the horizontal gear 78 includes a plurality of spaced teeth 83 formed thereon.

Figure 7:
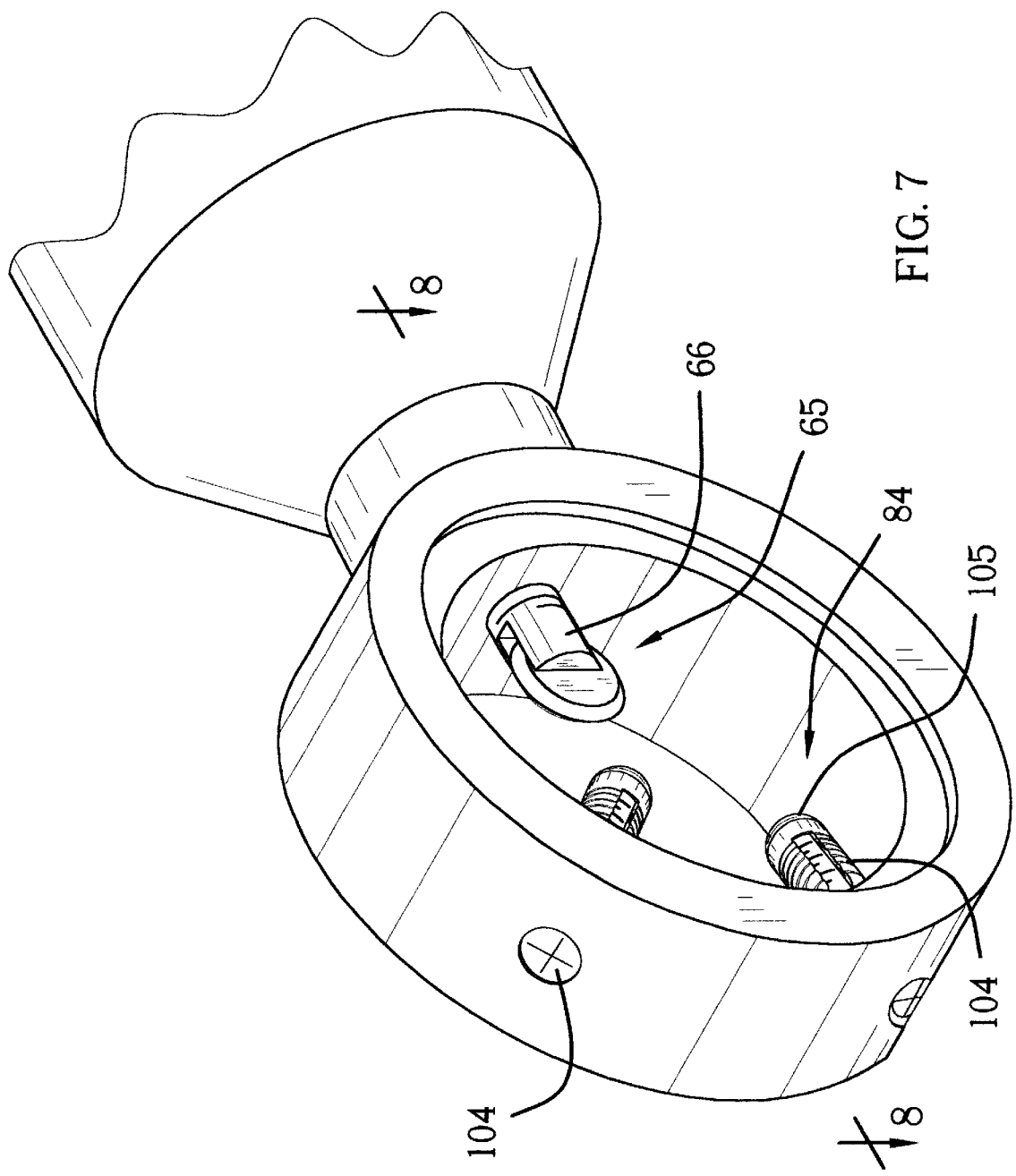
FIG. 7 is a schematic perspective view of a cutting attachment of the present invention.

As illustrated in FIGS. 7 and 8, a pair of rollers 84 may be rotatably mounted on the inner surface 63 of the inner annular member 55. Each of the rollers 84 may include a threaded shaft portion 104 and a roller portion 105. In one embodiment of the present invention the threaded shaft portion 104 of each of the rollers 84 is threadedly coupled to the inner surface 63 of the inner annular member 55. The roller portion 105 of each of the rollers 84 is preferably rotatably mounted on an end of each of the threaded shaft portions 104.

In one embodiment of the present invention, the threaded shaft portion 105 of each of the rollers 84 is positionable between a retracted position and an extended position. The retracted position is characterized by the roller portions 105 of the rollers 84 being positioned generally adjacent to the inner surface 63 of the inner annular member 55. The extended position is characterized by the rollers portions 105 of the rollers 84 being positioned generally nearer a central axis of the inner annular member 55 than the inner surface 63 of the inner annular member 55. Each of the rollers 84 is generally opposed to the threaded post 66 such that a user may rotatably turn each of the rollers 104 to adjust for various pipes having different diameters. The protrusion of the rollers may be adjusted by inserting a screwdriver through an aperture in the outer annular member and into a slot formed in the end of the threaded shaft portion 104.

The rollers 84 may be adjusted permitting pipes from three-eighths inch to one inch to be cut. However, the inner annular member 55 and the rollers 84 may be manufactured permitting the cutting of various sized pipes.

In one embodiment of the invention, a gear assembly 85 (see FIGS. 8 and 12) is provided for simultaneously rotating the inner annular member 55 and gradually advancing the cutting member 76 into the hole defined by the inner annular member 55 by rotating the horizontal gear 78. The gear assembly 85 may include a drive gear 86 that is operatively coupled to the motor shaft of the motor. Teeth on the exterior of the drive gear engage teeth formed on a lateral side of a transfer gear 87, which is rotatably mounted on an axle shaft. The transfer gear also has teeth formed on the circumferential edge, and these circumferential teeth engage circumferential teeth formed on a ring gear 88, which is nested in the outer annular member 49 alongside the inner annular member 55 in a manner so that the ring gear 88 and the inner annular member 55 rotate about the same axis. A guide structure 90 may be formed on an outer side of the ring gear and an inner side of a retainer plate 91 to keep the ring gear relatively centered inside the outer annular member and engaged with the teeth of the transfer gear 87. On a lateral side of the ring gear 88 are formed a plurality of teeth that engage the teeth formed on the outer edge 81 of the horizontal gear 78. Turning of the ring gear 88 thus produces a turning of the horizontal gear 78. A keyway 93 extends into a groove 94 in the threaded post 66, and thereby resists any turning of the threaded post with the horizontal gear. The rotation of the horizontal gear with respect to the threaded post causes the threaded post to be gradually advanced in the bore 67 of the inner annular member by the threads of the inner threaded edge 80 of the horizontal gear engaging the threaded outer surface 68 of the threaded post.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A motorized device for cutting and cleaning a piece of pipe, said device comprising:

a housing having a pair of opposite ends, at least one end of said housing has a pair of protruding portions formed thereon;

at least one motor being mounted in said housing, said motor having a motor shaft extending away therefrom;

a power supply mounted in said housing for selectively providing power to said motor;

at least one switch for selectively providing power to said motor, said switch being mounted on said housing;

at least one attachment being removably mounted on said motor shaft for cleaning a pipe;

a pair of second attachments for cutting and cleaning an outer surface of the pipe, each of said second attachments including:

a base member for connecting each of the second attachments to said motor shaft;

an outer annular member being mounted on said second end of said base member;

an inner annular member being removably mounted in said outer annular member for engaging the pipe;

a gear assembly mounted in said base member for rotatably turning said inner annular member within said outer annular member;

wherein said inner annular member has a cutting assembly for cutting the piece of pipe, said cutting assembly including:

a threaded post being mounted in a bore extending in said inner surface of said inner annular member, an outer surface of said threaded post being threaded;

a guide rod being mounted on said inner annular member, said threaded post being slidably mounted on said guide rod;

a cutting member for cutting the piece of pipe, said cutting member being rotatably mounted on an end of said threaded post; and a horizontal gear for slidably moving said threaded post on said guide rod, said drive gear rotatably engaging said horizontal gear, said horizontal gear threadedly engaging said threaded post.

2. The motorized device of claim 1, wherein said housing has a pair of motors mounted in said housing, each of said motors having a motor shaft extending axially through one of said ends of said housing, a pair of switches being mounted on said housing for selectively providing power to each of said motors.

3. The motorized device of claim 1, additionally including a handle for holding said housing, an end of said handle being pivotally mounted on said housing, said power supply being removably mounted in said handle.

4. The motorized device of claim 1, wherein each of said ends of said housing has a perimeter shoulder formed thereon, said motor shaft extending outwardly through said perimeter shoulder.

5. The motorized device of claim 1, wherein said attachment includes:

a socket for connecting said attachment to said motor shaft, said socket having a bore extending into an end of said socket, said motor shaft being removably inserted in said bore;

a brush head having an elongated central portion mounted on said socket, each of a plurality of bristle portions being mounted perpendicularly on said central portion such that each of said bristle portions radiates outwardly from said central portion.

6. The motorized device of claim 1, wherein said gear assembly includes:

a gear socket being rotatably mounted in a bore extending in a first end of said base member and extending toward a second end of said base member, said motor shaft being removably mounted in said gear socket;

a drive gear being rotatably mounted in a channel extending through said first and second ends of said base member and being operationally coupled to said gear socket, said drive gear being operationally coupled to said inner annular member;

a fastening member for slidably fastening said drive gear in said channel of said base member, said fastening member extending axially through said drive gear;

a key for securing said drive gear in an extended position, said key being removably mounted in said channel of said base member; and a cover member for selectively closing said first end of said base portion, said cover member being threadedly coupled to an inner surface of said base member.

7. The motorized device of claim 1, wherein an outer surface of said base member has a pair of channels extending therein, each of protruding portions of said housing being removably insertable into one said channels of said outer surface of said base member.

8. The motorized device of claim 1, wherein said outer annular member has a pair of edges, each of said edges having a plurality of spaced tab portions formed thereon, an outer surface of said inner annular member having a plurality of channels extending therein, each of said channels having a size and shape adapted for selectively receiving one of said tab portions of said outer annular member such that said inner annular member may be moved between said tabs when said tabs are aligned with said channel, wherein said inner annular member is rotatably mounted in said outer annular member.

9. The motorized device of claim 6, wherein an outer surface of said inner annular member has an annular groove therein, an inner surface of said annular groove having a plurality of teeth formed thereon, wherein an outer surface of said gear socket and said drive gear have a plurality of teeth formed thereon, said teeth of said drive gear selectively engaging said plurality of teeth of said gear socket and said plurality of teeth of said annular groove.

10. The motorized device of claim 1, wherein said inner annular member has a plurality of spaced cleaning members for cleaning an exterior of the pipe, each of said cleaning members being mounted on an inner surface of said inner annular member, each of cleaning members being orientated generally perpendicular to a central axis of said inner annular member.

11. The motorized device of claim 10, wherein said threaded post is positionable between a retracted position and an extended position, wherein said retracted position is characterized by a first end of said threaded post being positioned generally adjacent to said inner surface of said inner annular member, wherein said extended position is characterized by said first end of said threaded post being positioned generally nearer a central axis of said inner annular member than said inner surface of said inner annular member.

12. The motorized device of claim 11, wherein said guide rod guides said threaded post between said retracted position and said extended position, said rod being mounted on a bottom wall of a bore extending into said inner annular member, an end of said rod being slidably positioned in a hole extending in a second end of said threaded post.

13. The motorized device of claim 11, wherein said horizontal gear moves said threaded post between said retracted position and said extended position, said horizontal gear being mounted in an orbicular channel in said bore of said inner annular member, said orbicular channel and said annular channel of said inner annular member being in communication, said threaded post extending through a central portion of said horizontal gear.

14. The motorized device of claim 13, wherein said horizontal gear has an inner threaded edge and an outer edge, said inner threaded edge being selectively engaged with said outer surface of said threaded post, said outer edge of said horizontal gear having a plurality of spaced teeth formed thereon.

15. The motorized device of claim 10, additionally including a pair of rollers being rotatably mounted on said inner surface of said inner annular member, each of said rollers being generally opposed to said threaded post for abutting the outer surface of the piece of pipe inserted through said inner annular member.

* * * * *